United States Patent

Sampson et al.

[15] 3,638,154
[45] Jan. 25, 1972

[54] BRAIDED SUPERCONDUCTOR

[72] Inventors: William B. Sampson, Bellport; Richard B. Britton, Setauket, both of N.Y.

[73] Assignee: The United States of America as represented by the United States Atomic Energy Commission

[22] Filed: Mar. 26, 1970

[21] Appl. No.: 22,944

[52] U.S. Cl. .......................... 335/216, 174/117, 174/126 R
[51] Int. Cl. ..................................................... H01f 7/22
[58] Field of Search .............. 335/216, 299; 174/117 M, 126, 174/DIG. 6; 317/123

[56] References Cited

UNITED STATES PATENTS

| 3,502,789 | 3/1970 | Barber et al. | 335/216 |
| 3,067,569 | 12/1962 | Kelley | 174/126 |
| 3,349,169 | 10/1967 | Donadieu | 335/216 X |

*Primary Examiner*—George Harris
*Attorney*—Roland A. Anderson

[57] ABSTRACT

Magnet having braided superconductor windings for pulsed operation.

21 Claims, 3 Drawing Figures

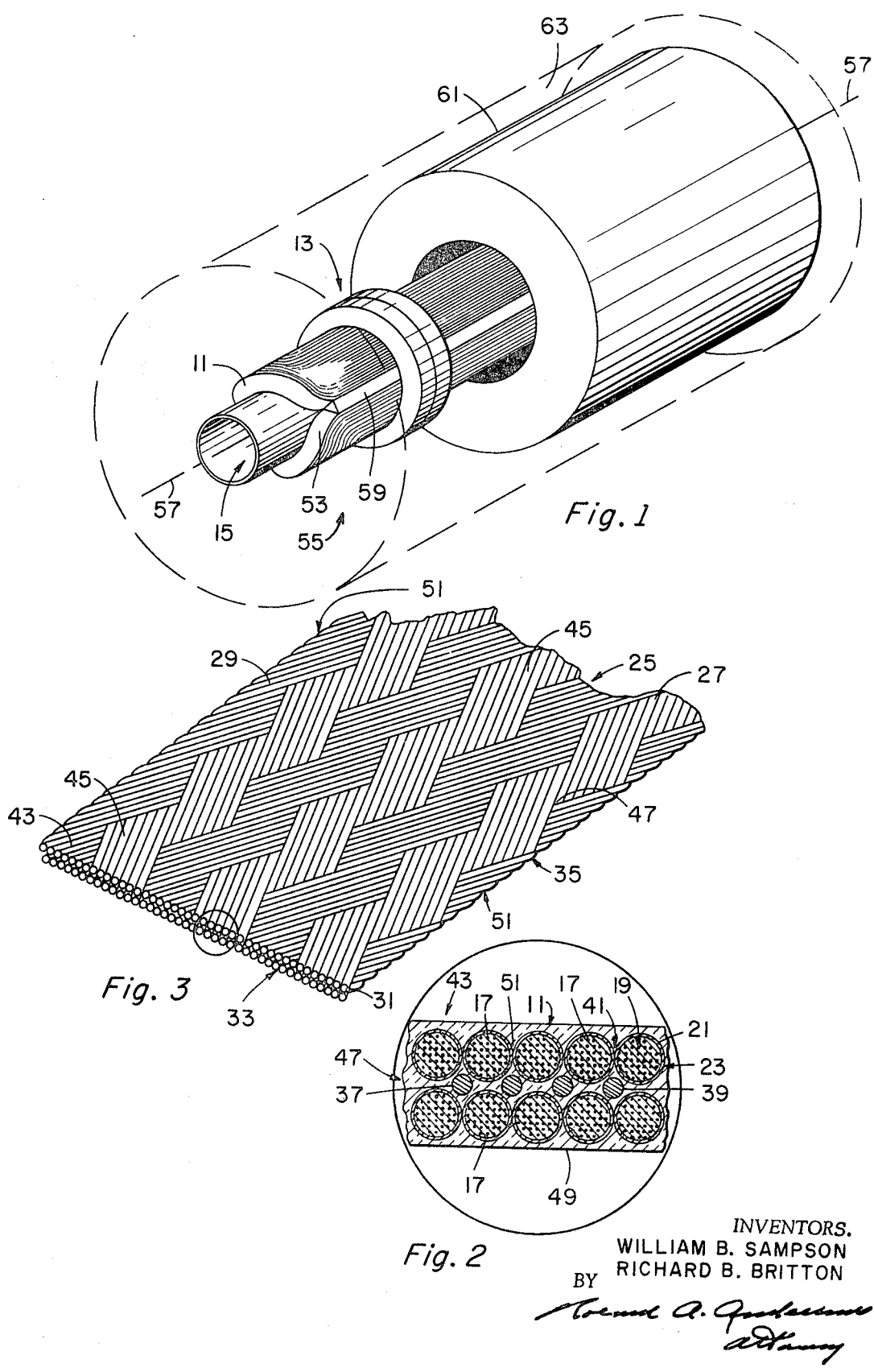

BRAIDED SUPERCONDUCTOR

BACKGROUND OF THE INVENTION

In high-energy physics, a need exists for magnets capable of producing magnetic focusing and/or bending fields for transporting high-energy charged particles. In strong focusing proton synchrotrons, such as described in the "Brookhaven Alternating Gradient Synchrotron" by John P. Blewett, which is reprinted from the 1960 International Convention Record, Part 9, these magnets are pulsed from low field strengths down to about 120 gauss, to high field strengths of up to about 13,000 gauss, in short times, e.g., about 1.2 seconds, and in cycles that repeat, e.g., every three seconds, for accelerating protons from low energies down to about 50 m.e.v., to high energies up to about 33 g.e.v. or more. Heretofore, however, these magnets have been difficult or expensive to operate, since they have required normal resistance conductors that have consumed large amounts of electrical power. Moreover, while DC superconductors have looked promising for pulsed applications, the pulsing losses were found to rise at higher fields making their overall efficiency only marginally better than conventional copper conductors. Another problem has been flux jump instabilities, comprising unpredictable or temporary localized normal resistance areas in the superconducting winding that have made it difficult to increase the current to high values in the winding. In this regard, it has often been difficult or impossible to prevent these instabilities from developing to a point where the superconductivity of the entire magnet winding has been destroyed. Additionally, even in DC operation, where large, monotonically increasing currents have initially been required in arriving at a static, persistent or flat-topped high field strength, these instabilities have produced discrepancies between calculated and obtained fields, as described by the coinventor of this application in the Mar. 1967, "Scientific American," on pp. 115 et seq. It is thus advantageous to provide an improved superconducting magnet and means for stabilizing flux jumps to allow dependable, reliable, and predictable conduction of pulsed or steady currents for producing high pulsed magnetic fields as well as static or persistent, flat-topped magnetic fields in a trouble-free manner.

SUMMARY OF THE INVENTION

This invention, which was made in the course of, or under a contact with the United States Atomic Energy Commission, provides a simple, effective and economic stabilized superconductor for producing pulsed magnetic fields for transporting charged particles for high-energy accelerators, such as the Brookhaven National Laboratory strong focusing accelerator mentioned above. More particularly, this invention contemplates braided, stabilized, superconductor filaments. In one embodiment, composite, twisted, stabilized superconductors are transposed by braiding, and the braiding forms ribbons having a fine network of electrical interconnections, and a fine overall network of fine foramina. Provision is also made by this invention for shorting and strengthening the ribbon, by conducting and insulating means interlaced therewith. With the proper selection of components and their fabrication, as disclosed in more detail hereinafter, the desired magnet is achieved for high DC as well as variable or pulsed currents. Also, provision is made for uniform stored energy distribution.

The above and further novel features and objects of this invention will become apparent from the following detailed description when the same is read in connection with the accompanying drawings, and the novel features of the invention will be particularly pointed out in the appended claims.

BRIEF DESCRIPTION OF THE DRAWINGS

In the figures where like elements have like reference numbers:

FIG. 1 is a partial three-dimensional view of a magnet for producing high-strength, pulsed magnetic fields for transporting high-energy charged particles in accordance with this invention;

FIG. 2 is a partial cross section of a compound, stabilized superconductor wire having a core formed from a plurality of twisted superconducting filament for the magnet of FIG. 1;

FIG. 3 is a partial three-dimensional view of a braided superconductor ribbon made in accordance with this invention from the compound, stabilized superconductor wire of FIG. 2.

DESCRIPTION OF THE PREFERRED EMBODIMENT

This invention is useful in producing pulsed high-strength magnetic fields for transporting and confining high-energy charged particles in the above-mentioned BNL AGS. More particularly, the stabilized superconductor 11 of this invention is useful in solenoids or multipole magnets, such as the dipole magnet 13, shown in FIG. 1. However, quadrupole or higher harmonic multipole magnets designed to operate at high current densities for confining charged particles in existing systems and/or in proposed or high-energy machines to accelerate charged particles up to energies of ≈1,000 g.e.v. or more, can also be made with the stabilized superconductor 11 of this invention. In this regard, for high field gradients and high field strengths for confining ultra-high-energy particles, the magnetic aperture 15 of the magnet 13 of FIG. 1 can be made quite small by the use of suitable high-energy injectors that minimize the stored energy and power supply requirements of the magnet 13. Thus, for example, this invention contemplates small (down to ≈3.8 cm. diameter) magnetic field apertures 15 for confining high particle energies, which require high current densities up to >40,000 a./cm.$^2$. However, as will be understood from the following, this invention is useful in any pulsed or static field multipole or solenoid magnet where very precise high magnetic field strengths or high field gradients are required.

In understanding how the established superconductor 11 of this invention provides the desired high pulsed magnetic fields in a magnet 13 for high-energy synchrotrons, it will be understood that conventional superconductors, although they are lossless during static field conditions, dissipate energy when the field is changing. Since this requires energy removal at cryogenic temperatures, and thus large and expensive refrigerators, the required removal must be rather small if a superconducting charged particle confining device is to be economically attractive. Moreover, at low frequencies, the energy dissipated per cycle is independent of frequency but strongly dependent on the field distribution in the windings.

In accordance with this invention, transposition is provided that makes the losses low. To this end many superconductor wires are crisscrossed to form a ribbon. Also, these wires progress across the cross section of the ribbon and down the length thereof so as to give all the wires thereof an equal inductance over the length of the ribbon. To this end, each and every wire crisscrosses the ribbon periodically, substantially, and progressively to sweep across every possible cross-sectional position from one ribbon edge to the other edge thereof and from the top to the bottom of the ribbon. Advantageously, the pitch of the transverse crisscrossing is large, e.g., 15°–22°, whereby each wire progresses in a cycle back to its starting position in about four to eight ribbon widths. This improves the packing fraction of the wires within the ribbon.

Referring now to FIG. 2, in one embodiment, the stabilized superconductor 11 of this invention, advantageously comprises a superconductor material, such as the type II intermetallic compound of $Nb_3Sn$, which provides high current-carrying capacity (i.e., has a high critical current $I_c$) and a high upper critical magnetic field (i.e., a high $H_c$). Advantageously, this high critical field is over 90,000 gauss, which is available for example in the case of thin $Nb_3Sn$ filaments 17. Since thin cross section superconductors are advantageous, thin cross section ductile superconducting filaments 17, such as Nb-Ti, may alternately be employed. In this case they are commercially available in small compound wire diameters of 0.004 to 0.008 in. overall diameter where the individual superconducting cores have diameters no greater than about 0.0001 inch, and are made by conventional techniques, such as drawing through dies. However, other conventional means are also known for producing thin cross section superconducting filaments 17. One such alternate production technique, comprises vapor deposition of Nb$_3$Sn on a thin cross section substrate, such as a nichrome wire having a diameter of less than 0.0001 inch. A suitable vapor deposition technique for the above-described filament 17, comprises concurrently vaporizing molten Nb and Sn in heated chlorinators to produce NbCl$_4$ and SnCl$_2$, and reacting the same with H$_2$ in the presence of the heated substrate to coat the same with NB$_3$Sn while removing HCl and unreacted gas. A description in "RCA Superconductive Material and Magnets," copyrighted in 1966 and 1967, particularly FIG. 1 of a paper therein by F. R. Nyman, illustrates one such deposition system, entitled, "Vapor Deposition of Niobium Stannide, a Versatile Process." Suitable processes are also available for Nb–Ti for advantageously providing filaments up to only 0.0003 inch in diameter.

Advantageously, the described thin filaments 17 for a twisted multifilament superconductor core 19 embedded in a low-conductivity matrix 21 to form a compound, wire 23. To this end the filaments 17 can be twisted and then assembled in a matrix 21 formed by a low-conductivity coating or sheathing applied by conventional means. Suitable methods, for example, comprise vapor deposition of a low-conductivity matrix 21 from a conventional plasma gun, which is used to coat the core, or conventional metallurgical processes, such as hot dipping or electrolysis. Advantageously, however, the matrix 21 is formed by imbedding the core 19 in the matrix 21 by casting and subsequent extrusion. Suitable materials for matrix 21 advantageously comprise the pure normal resistance metals selected from the group consisting of the good heat sink materials of lead, cadmium or indium, which are described in U.S. Pat. No. 3,486,146. However, other normal resistance materials may be used comprising copper, aluminum, tin, titanium, niobium, vanadium, hafnium, magnesium, iron, nickel, cobalt, zirconium, beryllium, and/or metal alloys, such as stainless steel and nichrome.

In order to provide a fine overall network 25 of short, closely spaced, compound wires 23 and (shorted) electrical interconnections 27 for providing stabilization therefor in accordance with this invention, a plurality of compound wires 23 are braided to form a stabilized superconductor ribbon 11 having two tightly packed tiers 31 of periodically bent, strained, twisted and elongated compound wires 23 in a laced configuration 33 that transposes the compound wires 23 in overlapping, crisscrossed, V-shaped zigzag patterns 35, as shown in FIG. 3. In this regard, this transposition by the laced configuration 33 magnetically decouples the electrically conducting elements of the ribbon 11 and the matrix 21 provides insulation around filaments 17, straining, and shorting paths between the compound wires 23 when the ribbon 11 is wound into a magnet 13 and held at superconducting temperatures in a suitable cryostat, such as is well known in the art.

Moreover, for mechanical stabilization, advantageously nichrome wires 37 are interlaced with compound wires 23, although stainless steel wires 37 may alternately be used. To this end the wires 37 are braided in and out of the laced configuration 33 between tiers 31 of compound wires 23 to be equidistant between four compound wires 23 (such as shown in cross section in FIG. 3). This structure is advantageously formed during the braiding operation to provide a flexible ribbon having longitudinal mechanical stability. Also, mechanical stabilization by wires 37 forms both a thermal sink 39 for compound wires 23 and normal resistance shorting bars therefor. This braiding (and the twisting) also causes straining of the superconductors, which causes results that may be explained as preferred superconducting current paths, as described in U.S. Pat. No. 3,546,541, by Schweitzer and Adams, filed July 10, 1968, by the assignee of this application.

In operation, seven, parallel, compound wires 23 are arranged to form in cross section periodic cusps 41 having seven mechanically stabilizing wires 37 centered therein, thus to form 14 wire strands 43. One of these strands is braided in and out of tiers 31 at an angle to a like 14-wire strand 43 to form intersecting parallelogram-shaped current sheet plates 45 having first parallel currents therein, and like plates 45 either underlying or overlying the same with like parallel currents therein at an angle to said first currents. This provides ribbon 11 with magnetically decoupled and electrically insulated, compound wires 23, interlaced with normal resistance mechanically stabilizing wires 37 to form a shorted flexible, mechanically stabilized, foraminous heat sink 39. In one embodiment, this heat sink 39 is exposed to cryogenic fluid passing through foramina 47 of ribbon 11 and along, over, around and through ribbon 11.

In another embodiment, in order to provide additional mechanical stability between the compound wires 23 to support them against magnetic forces during pulsing and to reduce rubbing and abrasion between these compound wires 23, and insulating medium 49, such as a thermosetting polymer, is impregnated into said foramina 47 and laminated with said compound wires 23 of the ribbon 11 while leaving the extreme edges 51 of said ribbon 11 exposed for efficient thermal conduction of internal heat to the cooling fluid.

When ribbon 29 is wound into a dipole magnet 13 having shim stepped windings 53 that approximate a smoothly varying dipole current sheet function, a dipole magnetic aperture 15 is provided. In the embodiment of FIG. 1, the magnet 13 has four current blocks 55 in each quadrant around the axis 57 of magnet 13 and forms in cross section a circular aperture 15 of 5 cm. diameter by 30 cm. long. To this end, the ribbon 11 advantageously is 1.58 cm. wide and has insulating shims 59 between the adjacent windings 53 formed by the turns of the ribbon 11. A description of the current distribution provided in accordance with this invention is given by the BNL Computer Program MAGFLD, which is described in BNL Accel. Dept. Internal Report AADD–145 (1968) by G. H. Morgan. As described therein this system has the advantage of decreasing the number of six-, 10- and 14-pole harmonics resulting from the practical problem that the number of turns in each block 55 is an integer.

In accordance with this computer program, this MAGFLD program designs the winding and stepping of the symmetrical magnet 13 of FIG. 1, from discrete current density rectangular blocks 55 of arbitrary size and orientation. The block parameters may be read in individually (up to 32 blocks), but advantageously the blocks in the first octant or quadrant are read in and the type of symmetry specified. In the embodiment of this invention shown in FIG. 1 herein, the symmetry, comprises that of a dipole air core magnet for bending high-energy charged particles. To this end, the computer program optimizes the current ratios in the blocks 55, with currents antisymmetric in the Y-axis and in the X-axis in the conventional cartesian coordinate system, where the X-, Y- and Z-axes are normal to each other and the Z-axis coincides with the axis 57 of aperture 15 of magnet 13. As will be understood from this invention, however, uniform field gradient, elliptical or circular quadrupole symmetry may also be specified.

In one preferred embodiment, the above-mentioned computer program computes the field in aperture 15 of magnet 13 at up to 99 points at locations supplied by the user in a linear array specified by the first point and angle of the above-described embodiment of magnet 13 for the above-mentioned smoothly varying dipole current sheet function. Advantageously, this function corresponds to the function described in U.S. Pat. No. 3,461,410, which is incorporated by reference herein. To this end the function is $I_\theta = I_o \cos n\theta$ where $n=1$ in the case of the dipole of FIG. 1, and $I_o$ is the value of $I$ at $r=r_o$ and $\theta=0°$, and $I$ is the total current between $-II/4$ and $\theta$ and equals abamperes per centimeter on a current sheet of infinitesimal thickness and cylindrical geometry of radius $r_o$. Alternately, however, the user of the computer program can request calculation of the Fourier components so as to compute the field at 91 evenly spaced points on a circular arc of specified radius in the first two quadrants.

The computation of the field of each single block 55 makes use of expressions for the horizontal and vertical field components ($B_x$ and $B_y$) at the origin of arbitrary location having sides parallel to the axes. Points other than the origin or blocks 55 inclined to the axes are handled by appropriate coordinate transformations. The expressions for the field components for points external to the current block 55 are easily obtained by direct integration, but may also be obtained from the formula for the complex field given by Beth in J. Appl. Phys. 37, 2568 (1966) and 38, 4689 (1967).

Advantageously, a laminated iron shield 61 around the outside of magnet 13 eliminates the stray field outside the magnet 13 while minimizing eddy currents and providing a useful increase in the central field in aperture 15, as described in U.S. Pat. No. 3,461,410, which is incorporated by reference herein. The presence of a 2.5 cm. thick iron shield 61 around the magnet 13, in accordance with the embodiment of FIG. 1 of this invention, has a small effect on the harmonic content of the magnet 13 and is sufficient to reduce the external field to a reasonably low level. Also, the magnet 13 has a conventional cryostat 63 around the outside thereof. One suitable cryostat is described and shown in FIG. 3 of the above-cited U.S. Pat. No. 3,461,410, which is incorporated by reference herein. Thus, as is conventional, the cryostat has a vacuum insulated container filled with cryogenic cooling fluid such as liquid helium.

The above-described magnet 13 has twisted multifilamentary conductors 17 to reduce the dissipative properties thereof. In this regard, the effective "Q" thereof, which equals the peak stored energy divided by the loss/cycle, can be plotted against peak field. For pulses of triangular shape with a 1-second rise time, the effect of twisting an 85-core compound wire 23 shows the lowest Q's in a geometry that produces the highest fields. This illustrates the strong dependency of Q on the field distribution.

In accordance with this invention, the multiplicity of compound wires 23 are braided to transpose the wires 23, thus to decouple them so that they may operate efficiently in parallel, a condition that is not achieved by simple twisting of each filament 17. Thus, the ribbon 11 of this invention provides high Q's for a ribbon of fixed cross section and high total critical current, since the energy dissipation is inversely proportional to the superconductor cross section at high fields and current densities. Moreover, by reducing the cross section of the superconductor filaments 17 by an order of magnitude by vapor deposition as described above e.g., to $\approx 5\mu$, or by extrusion and multiple drawing of a ductile conductor, Q's greater than 1,000 are provided at high fields, e.g., up to 60 kg. or more, and current densities up to 60 ka./cm.$^2$. Additionally, the described ribbon 11 of this invention has very small diamagnetic effects, whereby the magnet 13 of this invention permits the design and fabrication of very precise high field pulsed magnets 13. In this regard, actual solenoid magnets have been provided in accordance with this invention, which have been operated at 60 cycles/sec. and at slower rates at up to 50 kilogauss. Moreover, actual dipole magnets have been operated up to 3 cycles/sec. and at slower rates at up to 40 kilogauss. This invention is actually feasible for synchrotrons, which require only up to 1 cycle/second.

This invention has the advantage of providing a practical and efficient, pulsed superconducting magnet for transporting charged particles. In this regard, this invention provides high Q's and stable operation dependably and reliably at high field strengths. Moreover, a particular braided ribbon is provided, which is simple and easy to construct, and which provides both static and pulsed operation in a magnet having low refrigeration losses. In one embodiment, the ribbon of this invention has the advantage of providing a particular magnet designed by computer to be shim stepped in accordance with a smoothly varying dipole current sheet function.

What is claimed is:

1. Apparatus for transporting pulsed currents producing strong variable magnetic fields, comprising means consisting of a fine crisscrossing network of braided superconductors imbedded in a normal resistance matrix that is arranged to define a foraminous, substantially fixed cross section ribbon having wires that can be pulsed to effect the production of said variable magnetic fields along said ribbon, and cryogenic cooling means for immersing said forminous ribbon in a cryogenic cooling fluid for maintaining said superconductors in their superconducting state during said pulsing.

2. The invention of claim 1 in which said matrix is a thin cross section normal resistance means forming a heat sink.

3. The invention of claim 1 in which said braiding decouples said wires by transposition.

4. The invention of claim 1 in which said braiding stabilizes said wires by straining and interlacing them.

5. The invention of claim 1 in which said superconductors are twisted filaments selected from the group consisting of the $Nb_3Sn$ filaments up to only 0.0001 inches in diameter, and NbTi filaments up to only 0.0003 inches in diameter.

6. The invention of claim 1 in which said braided wires form foramina for providing a fine network of cryogenic cooling passages.

7. The invention of claim 1 having normal resistance means interlaced with said braided wires for providing a flexible strengthening means for said ribbon.

8. The invention of claim 7 in which said normal resistance means provides shorting means for said wires.

9. The invention of claim 1 in which said braided wires are impregnated with a matrix material to provide mechanical support and stiffening means for said ribbon.

10. The invention of claim 1 in which said ribbon is arranged to form a dipole magnet according to a computer program.

11. Magnet for transporting high-energy charged particles in an evacuated container along an axis, comprising a ribbon of braided wires arranged around the outside of said container for selectively producing pulsed magnetic fields in said container for transporting said particles along the axis of said container, and means for cooling said ribbon by exposing the same to a cooling fluid, whereby the same can be efficiently pulsed selectively to produce said pulsed magnetic fields in said container for transporting said charged particles to high energies along said axis in accordance with the energy of said charged particles.

12. Apparatus forming a magnetic field within a longitudinally extending cylindrical aperture, comprising means consisting of a system of longitudinally extending, side-by-side, annular, conductive coils external to, and forming said aperture, said coils being ribbons of braided superconductors having a stabilizing matrix, whereby said coils may be efficiently cooled for pulsing them to produce said magnetic field.

13. In a multipole magnet for generating a strong 2n pole magnetic field within current sheets defining a cylindrical aperture for transporting charged particles and having external magnetic field cancelling means that enhances the strength of the field in said aperture, the improvement, comprising current sheets having braided superconductors, and cryogenic means for cooling said superconductors for efficiently providing for the pulsing of said magnet at high fields, thereby to provide for the transport of said particles at high field.

14. The magnet of claim 13 in which said braided superconductors, comprise filaments imbedded in a matrix having a conductivity lower than said filaments, and an insulator around said matrix that provides for the electrical and mechanical stability of said braided superconductors.

15. The invention of claim 14 in which said insulator is a thermosetting polymer.

16. The invention of claim 13 wherein said current sheets form foramina for circulating a cryogenic cooling fluid therethrough, whereby said magnet can be pulsed for accelerating said charged particles.

17. The invention of claim 16 in which said braided superconductors have shorting means interposed in at least a portion of said foramina for providing for said pulsing of said magnet and the maintenance of the same against mechanical, thermal, and electrical instabilities.

18. The invention of claim 16 in which said braided superconductors have a low conductivity matrix.

19. The invention of claim 13 having a normal resistance heat sink material around said superconductors selected from the group consisting of lead, cadium indium, copper, aluminum, tin, titanium, niobium, vanadium, hafnium, magnesium, iron, nickel, cobalt, zirconium, beryllium, and normal resistance alloys.

20. The invention of claims 13 having parallel strands of said superconductors in sets that are braided into a ribbon having layers that are relatively interleaved by transposition from the top to the bottom of said ribbon.

21. The invention of claims 13, in which said braided superconductors form current sheets having windings and shims that are selectively interleaved in accordance with the current sheet function $I_\theta = I_o \cos n\theta$.

* * * * *